Dec. 23, 1969  R. B. MISKIN ET AL  3,485,397
METHOD OF STACKING AND LOADING BALES
Original Filed Feb. 16, 1965  6 Sheets-Sheet 1

INVENTORS:
RICHARD B. MISKIN ~ MERLIN R. MISKIN
By: Lawrence J. Winter
ATTORNEY

Dec. 23, 1969 R. B. MISKIN ET AL 3,485,397

METHOD OF STACKING AND LOADING BALES

Original Filed Feb. 16, 1965 6 Sheets-Sheet 4

INVENTORS:
RICHARD B. MISKIN ~ MERLIN R. MISKIN
BY: Lawrence J. Winter
ATTORNEY

Dec. 23, 1969   R. B. MISKIN ET AL   3,485,397
METHOD OF STACKING AND LOADING BALES
Original Filed Feb. 16, 1965   6 Sheets-Sheet 5

INVENTORS:
RICHARD B. MISKIN ~ MERLIN R. MISKIN
BY: Lawrence J. Winter
ATTORNEY

Dec. 23, 1969     R. B. MISKIN ET AL     3,485,397

METHOD OF STACKING AND LOADING BALES

Original Filed Feb. 16, 1965     6 Sheets-Sheet 6

Inventors:
RICHARD B. MISKIN ~ MERLIN R. MISKIN
By: Lawrence I. Winter
ATTORNEY

United States Patent Office 3,485,397
Patented Dec. 23, 1969

3,485,397
METHOD OF STACKING AND LOADING BALES
Richard B. Miskin, Ucon, Idaho 83454, and Merlin R. Miskin, Lewisville Road, Idaho Falls, Idaho 83401
Original application Feb. 16, 1965, Ser. No. 433,065, now Patent No. 3,357,577, dated Dec. 12, 1967. Divided and this application Dec. 8, 1967, Ser. No. 689,091
Int. Cl. B65g 57/00; B65d 57/00
U.S. Cl. 214—152                                6 Claims

ABSTRACT OF THE DISCLOSURE

This invention describes a method of stacking and loading bales in layers in set patterns which will permit the stacking of a load of hay and the like on a vehicle platform for discharge therefrom as an integral unit comprising forming a predetermined number of vertical tiers extending transversely of the vehicle from individual bales and disposing the bales in adjacent tiers in non-symmetrical configuration to provide tie tiers to hold the load together upon upending it, said non-symmetrical configuration being formed of bales disposed out of alignment with each other so as to overlap the abutting portions of bales in adjacent tiers.

---

This is a divisional application of our application Ser. No. 4433,065, filed Feb. 16, 1965, now U.S. Patent No. 3,357,577, in the United States Patent Office.

The present invention relates to a method of loading and stacking bales of hay and the like, and unloading the stacked load from a vehicle.

It is an object of the present invention to provide a method of loading a plurality of individual bales of hay and the like on a vehicle utilizing a minimum number of man-hours and labor, and to further provide a method of discharging or unloading the stacked bales from the vehicle as an integral unit.

It is another object of the present invention to provide a method of stacking or loading a predetermined number of tiers or layers of substantially rectangular bales upon a vehicle platform so that the stack is stable and the platform can be upended or dumped from the horizontal position and placed on the ground intact without disassembling or rearranging the bales in the load during the unloading operation.

It is another object of the present invention to provide a method of arranging a plurality of individual bales in a compact stack of substantially rectangular configuration on a vehicle platform so that the tiers or layers of bales in the stack have an interlocking or knitting together effect on the adjacent layers with which they are in contact so that the entire load can be discharged from the vehicle as is commonly done in an upending or dumping operation, without the stack falling apart.

It is another object of the present invention to provide a method of arranging a plurality of individual and separate bales of hay and the like into a number of tiers or layers and loading the entire unit upon a vehicle platform so that the bales in adjacent tiers are disposed out of alignment with the other adjacent tiers to provide overlapping bales which bridge or span each other to provide a more stable and rigid load.

It is another object of the present invention to provide a method of arranging a load of stacked bales by utilizing a predetermined number of individual tiers or layers that are arranged so that two adjacent tiers have their stacks disposed in a non-symmetrical configuration so that the lines or gaps between the bales overlap one another to provide a stable load that can be readily discharged by upturning the load on a vehicle platform to dispose it on the ground without the load becoming disassembled in the unloading operation.

It is another object of the present invention to provide a method of placing bales of hay and the like on a loading deck of a truck or other vehicle provided with upending or dumping means so that the load is discharged from the vehicle by rotating the vehicle platform in a clockwise direction, which method maintains the bales firmly in place with respect to each other during the discharging operation. The present invention further provides a method of stacking a load of individual bales so as to withstand the forces of weather, settling movements, and other disturbances, and in which the load can be readily reloaded back onto a truck platform as a complete unit if desired.

It is another object of the present invention to provide a method of arranging a plurality of individual bales of hay and the like into a predetermined number of tiers or layers that can be loaded on a vehicle platform and discharged therefrom as an entire unit, and in which the bales are arranged in a non-symmetrical fashion so that a bale can be removed from the stack after it is placed on the ground without causing collapse of the remaining portion of the stack or load.

It is yet another object of the present invention to provide a method of stacking a number of individual bales by forming them into individual tiers and disposing the unit on a vehicle platform, and in which some of the bales are placed on end so that they extend in a substantially vertical direction and help to tie the load together when the load is tipped up into a stacked position and discharged from a vehicle platform onto the ground.

It is yet another object of the present invention to provide a method of arranging a stack or load of individual bales formed of a predetermined number of tiers or layers of bales in which two or more tiers in the load may be alike and placed in different positions in the load, and one tier may be identical to another tier except it is placed in an upside down position or reverse position, and two other tiers may be identical except one is facing in a direction opposed to the first one.

Various other objects and advantages of the present invention will be readily apparent from the following detailed description when considered in connection with the accompanying drawings forming a part hereof, and in which.

Figure 1:
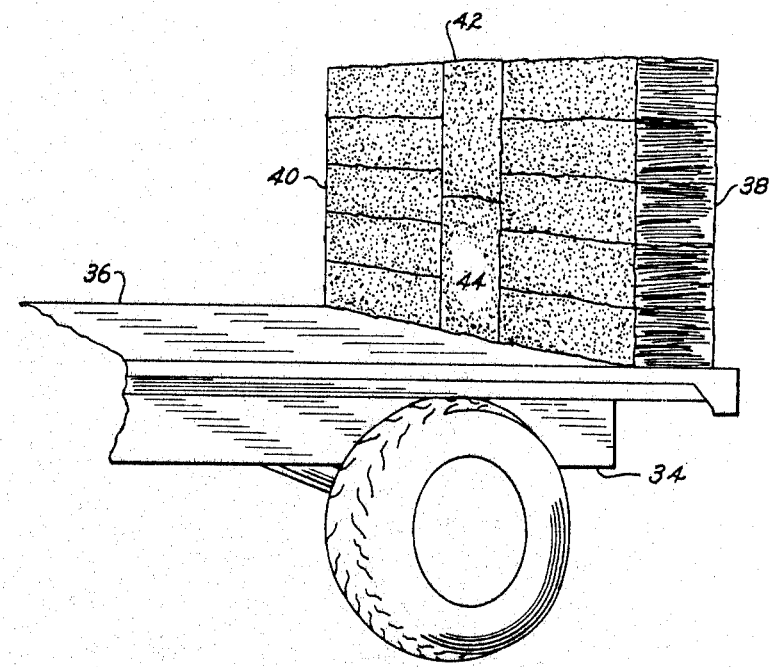
FIGURE 1 is a perspective view showing the rear portion of a vehicle with a tier of bales forming the last tier of bales on the rear end of the vehicle platform.
Figure 19A:
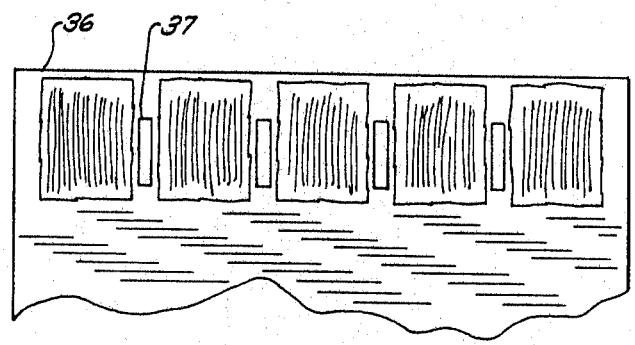
FIGURE 19a is a view taken along the line 19a—19a of FIGURE 19.
Figure 19:
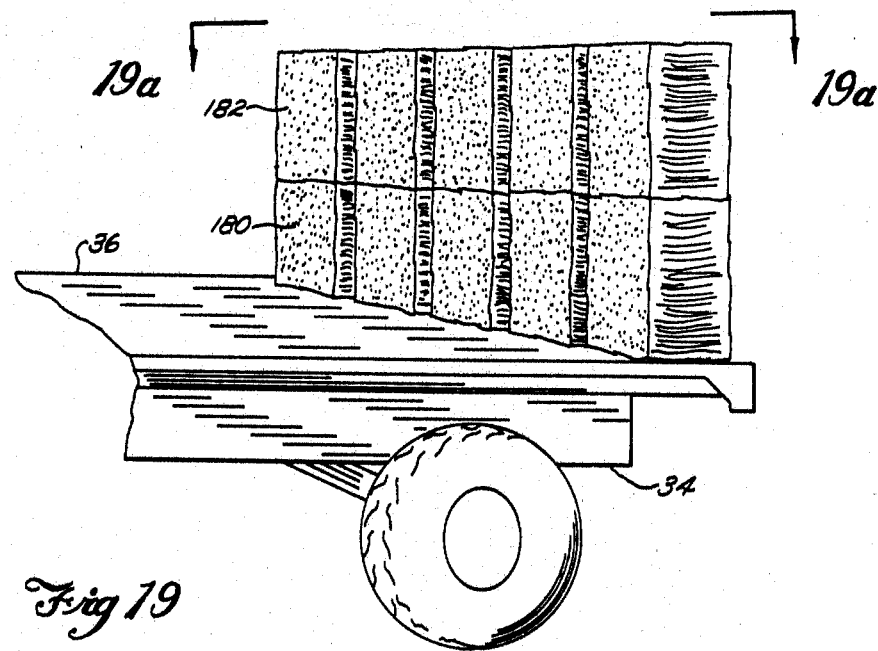
FIGURE 19 is a perspective view of the rear portion of a vehicle platform with the tier of bales shown in FIGURE 17 disposed thereon with the adjacent bales disposed in spaced relationship with each other.
Figure 21:
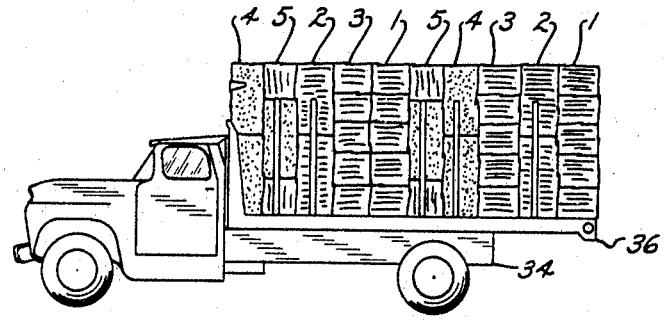
FIGURE 21 is a side elevational view of the vehicle with a full load disposed thereon.
Figure 22:
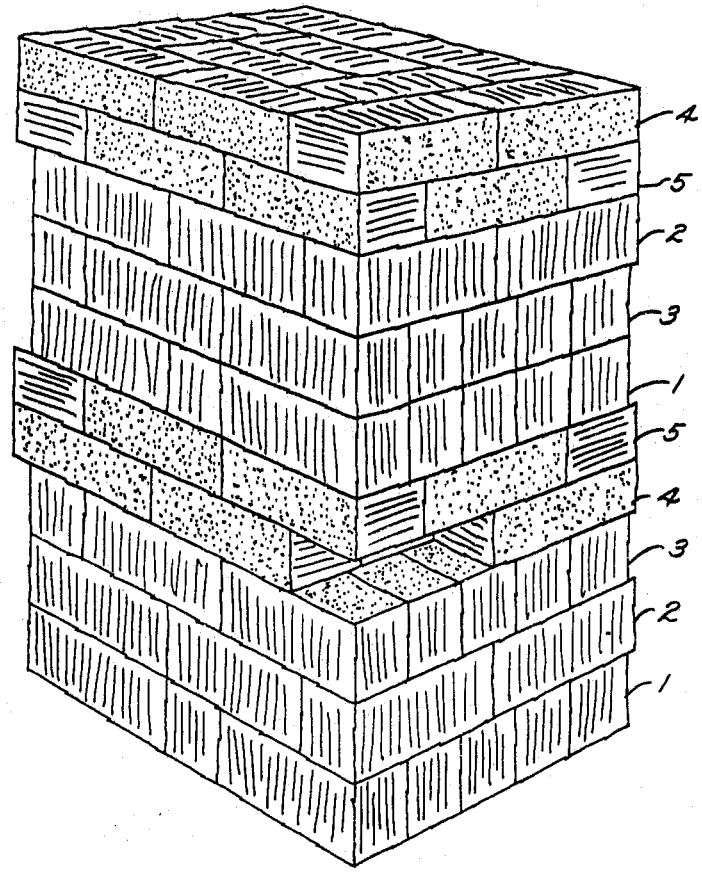
FIGURE 22 is a perspective view of the load of FIGURE 21 after it has been stacked in a vertical arrangement and disposed on the ground, after discharge from the vehicle platform.

Referring to FIGURES 1, 19, and 21, the reference numeral 34 generally designates a conventional vehicle or truck having a platform or deck 36 for stacking thereon a predetermined number of individual bales so as to form individual tiers or layers to provide a load or stack of hay and the like. The vehicle is provided with conventional means, not forming part of the invention, for pivoting the platform about its rear end, as best seen in FIGURE 21 so as to dump the load of baled hay thereon and to stack it in a vertical pile as best shown in FIGURE 22.

Six of the most common bale sizes for which load arrangements are suggested are: 14 x 18 x 36 inches, 15 x 19 x 38 inches, 15 x 19 x 46 inches, 16 x 18 x 36 inches, 16 x 18 x 40 inches, and 16 x 18 x 46 inches.

In placing the bales on the load it is not necessary to build up one tier at a time on the deck as shown in FIGURE 1. Several tiers or all of the tiers may be built up simultaneously.

Figure 20:
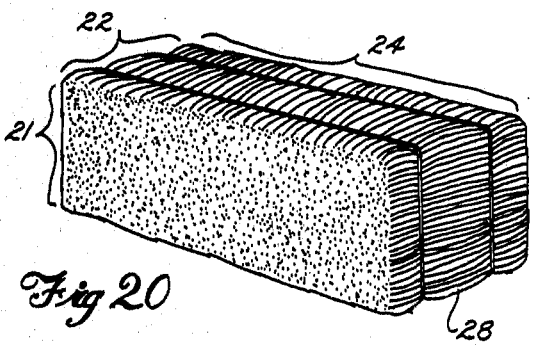
FIGURE 20 is a perspective view of a bale of hay illustrating the detail of the twine or wire by which it is bound together.

Referring to FIGURE 20, a bale is usually made by a baling machine so that it has three different dimensions which we will refer to as height 21, width 22, and length 24, the smallest dimension being the height, the next smallest dimension being the width, and the greatest dimension the length.

The stem length of the hay or straw along the bale is indicated at 28 by parallel lines, and the stubble by patches of dots.

One load arrangement is recommended for bale size 14 x 18 x 36 inches using the tiers or layers designated 1, 2, 3, 4 and 5, in FIGURES 21 and 22 and corresponding to the tiers shown in FIGURES 1 to 5 respectively.

Another load arrangement is recommended for bale size 15 x 19 x 38 inches, using tiers or layers 1, 2, 3, 4 and 5.

Another load arrangement is recommended for bale size 15 x 19 x 46 inches using tiers or layers shown in FIGURES 6, 7, 8 and 9.

Another load arrangement is recommended for bale size 16 x 18 x 36 inches using tiers or layers shown in FIGURES 4, 5, 10, 11 and 12.

Another load arrangement is recommended for bale size 16 x 18 x 40 inches using tiers or layers shown in FIGURES 1, 2, 3, 13 and 14.

Figure 6:
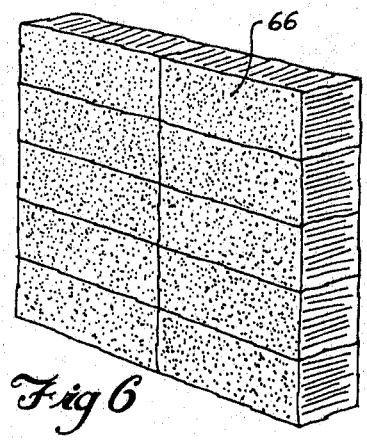
FIGURE 6 is a perspective view of a tier of bales disposed in a horizontal direction with the bales disposed on their sides.
Figure 15:
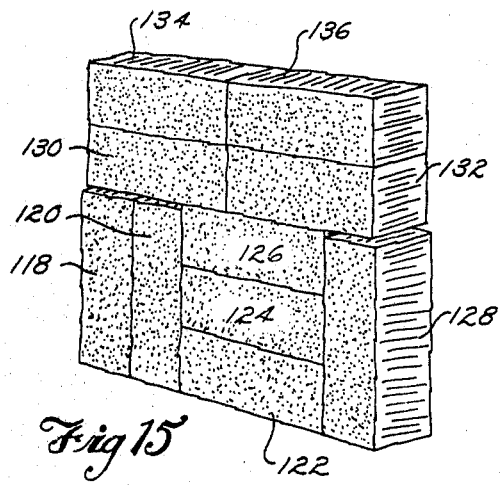
FIGURE 15 is a further modification of the tier of bales embodied in the present invention.
Figure 16:
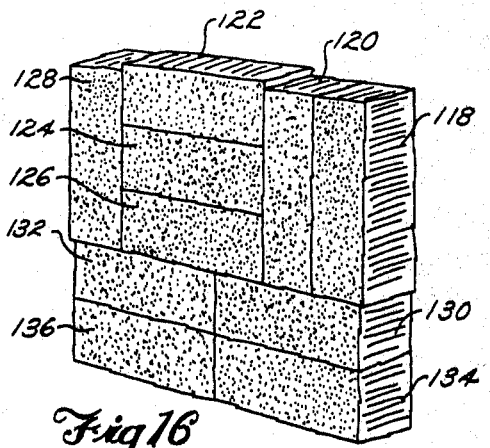
FIGURE 16 is a view of the tier of bales shown in FIGURE 15 except that it has been turned 180° in a clockwise direction.
Figure 17:
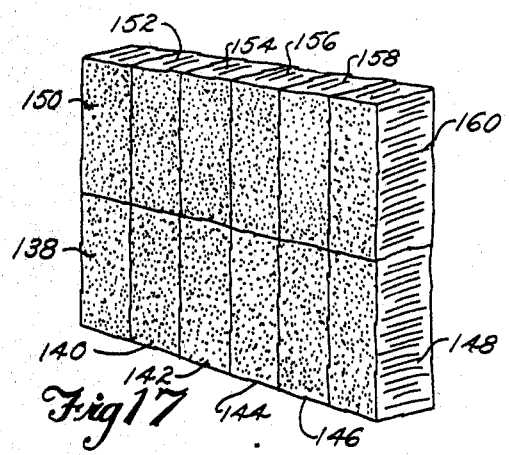
FIGURE 17 is a perspective view of another tier of bales embodied in the present invention, illustrating all of the individual bales disposed in a substantially vertical direction.
Figure 18:
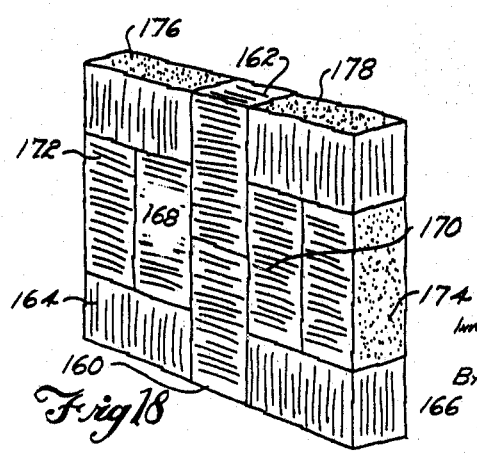
FIGURE 18 is another perspective view of a still further embodiment of the tier of bales of the present invention.

Another load arrangement is recommended for bale size 16 x 18 x 46 inches using tiers or layers in FIGURES 6, 15 and 16. Tiers or layers shown in FIGURES 17 and 18 are alternate tiers or layers to be used interchangeably. Tier or layer in FIGURE 19 is the bottom layer in the stack and is used in an alternate method of upending the load from truck onto the ground. Other load arrangements may be made and used without deviating from the use of our present invention.

In building a load or stack using tiers or layers in accordance with our present invention some of the tiers are used for the primary purpose of filling the space while others are for the purpose of tying or holding the stack into a closely knit unit. These will be referred to as filler tiers or layers and tie tiers or layers.

Referring to FIGURE 1, a filler tier is shown comprising ten individual bales disposed on the platform 36 with the pile of five bales on the right-hand side designated 38 stacked in vertical alignment with each other and positioned horizontally, transversely of the platform 36. The five bales of the pile 38 are further disposed on their sides. A second pile 40 of five individual bales is disposed on the left side of the platform 36 and is identical to the pile 38. Disposed between the pile 38 and 40 are two bales 42 and 44 disposed in a vertical direction, and standing on end with the bale 42 disposed on top of the bale 44. The inner ends of the bales in piles 38 and 40 are in contact with the vertical sides of the bales 42 and 44.

Figure 2:
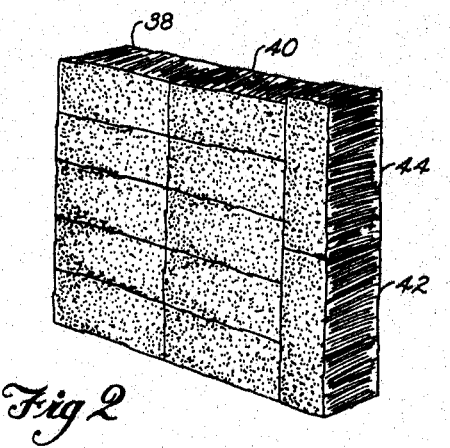
FIGURE 2 is a perspective view of another tier of bales.

Referring to FIGURE 2, the horizontally disposed piles 38 and 40, identical to the piles 38 and 40 of FIGURE 1, are turned on their side and are disposed with their inner ends in contact with each other. The two bales 42 and 44, substantially identical to the bales 42 and 44 in FIGURE 1 are disposed on their end so as to be positioned in a vertical direction in alignment with each other, are disposed adjacent the right end of the pile 40.

Figure 3:
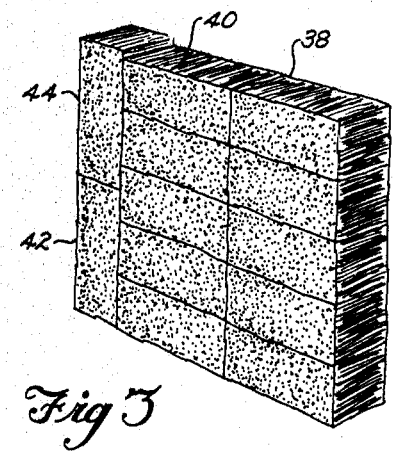
FIGURE 3 is a perspective view of the tier shown in FIGURE 2 after it has been burned through an angle of 180° in a clockwise direction.

Referring to the tier of bales shown in FIGURE 3, this is identical to that shown in FIGURE 2 except that the tier has been turned or rotated 180° in a clockwise direction, so that it in effect is oppositely disposed with respect to the tier shown in FIGURE 2.

Figure 4:
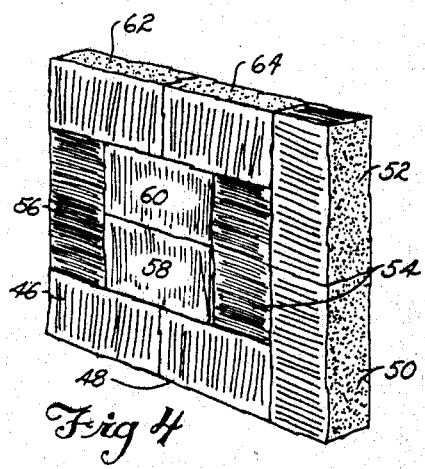
FIGURE 4 is a perspective view of another modification of the tier of bales.

Referring to the tier of individual bales shown in FIGURE 4, this is a tie layer when in the stack and is provided with two horizontal bales 46 and 48 disposed in their upright position and with the inner ends abutting each other and extending transversely of the vehicle platform. The right end of the bale 48 is abutted by a vertically disposed bale 50 upon which is disposed another vertically disposed bale 52. The right end of the bale 48 has disposed thereon a vertically disposed bale 54 while the left end of the bale 46 has disposed thereon a vertically disposed bale 56. Two horizontally disposed bales 58 and 60 are disposed upon the adjacent inner ends of the bales 46 and 48, and adjacent the inner sides of the bales 54 and 56. The upper portion of the tier has disposed thereon two horizontal bales 62 and 64 resting on the bales 56, 60 and 54. It will be noted that this tie tier when placed laterally of the tiers as shown in FIGURES 1, 2 and 3, will overlap the individual bales of these other tiers, or in other words, the cracks or gaps or lines of demarcation that occur between one bale and the next one in adjacent tiers will be spanned over or bridged across by the bales in the other adjacent tier.

Figure 5:
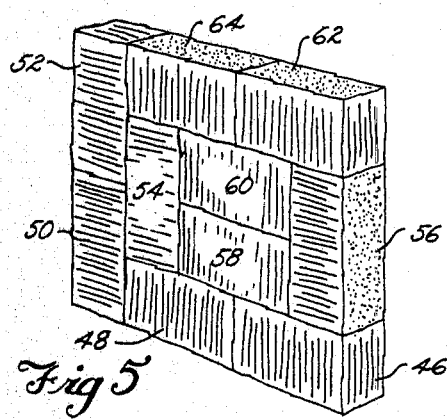
FIGURE 5 is a perspective view of the tier shown in FIGURE 4 except that it has been turned 180° in a clockwise direction.

Referring to FIGURE 5, this tier is substantially the same as that described in connection with the tier shown in FIGURE 4 except that the tier has been turned or rotated in a clockwise direction 180°.

Referring to FIGURE 6 the filler tier shown therein consists of two piles 66 of five bales each, with the bales being horizontally disposed and adapted to extend transversely of a vehicle platform, with the ends 28 of one pile of bales abutting or in contact with the adjacent end of the other pile of bales. It will be further noted that the individual bales are turned on their sides in FIGURE 6.

Figure 7:
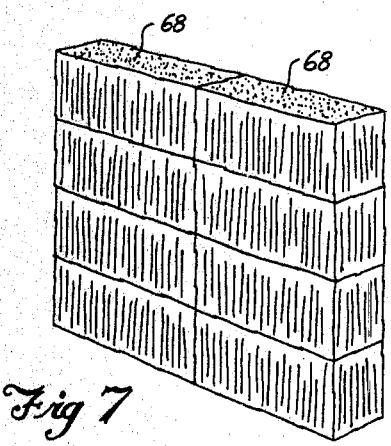
FIGURE 7 is a view similar to FIGURE 6 except that the bales are disposed in a horizontal direction but right-side up instead of on their sides.

Referring to FIGURE 7, this is substantially the same as that shown in FIGURE 6 except the horizontal bales 68 are four deep and are disposed in an upright position, as distinguished from being turned on their sides. The tier shown in FIGURE 7 is a filler tier as is that in FIGURE 6.

Figure 8:
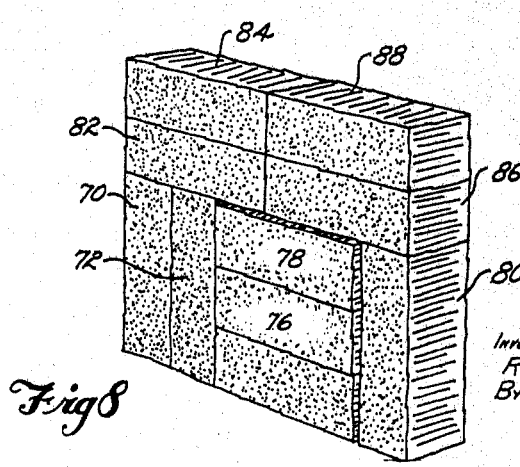
FIGURE 8 is another embodiment of the arrangement of a tier of bales.

Referring to FIGURE 8, a tie layer is shown therein by placing two bales 70 and 72 on end so they are disposed in a vertical direction on the left lower side of the tier. The right side of the vertical bale 72 is in contact with three horizontally disposed bales 72, 76 and 74, stacked in vertical alignment. A small vertical space is left adjacent the right end of the bales 72, 76 and 74, and a vertically disposed bale 80 is disposed adjacent the right side of the vertical space. Thereafter a horizontally disposed bale 82 is placed athwart the upper ends of the bales 70 and 72 and extends over the bale 78 while another horizontally disposed bale 86 is disposed athwart the end of the bale 80 and extends across the bale 78. Thereafter, a bale 84 is disposed over the bale 82 while a bale 88 is disposed over the bale 86 so that these bales 84 and 88 are disposed in vertical alignment with the bales 82 and 86 respectively.

Figure 9:
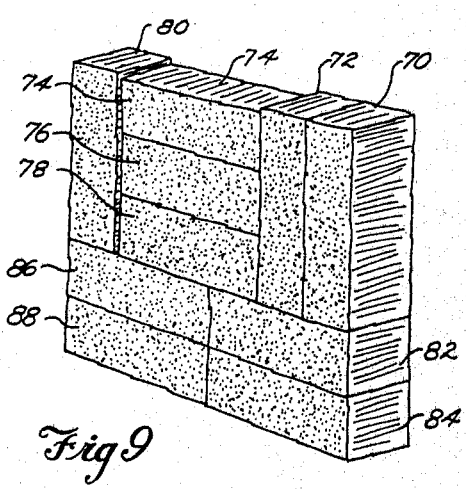
FIGURE 9 is a view of the tier of bales shown in FIGURE 8 but with the tier rotated or turned 180° in a clockwise direction.

Referring to FIGURE 9, this is the same tie layer as that described in connection with FIGURE 8 except that the tie layer has been turned or rotated in a clockwise direction 180°.

Figure 10:
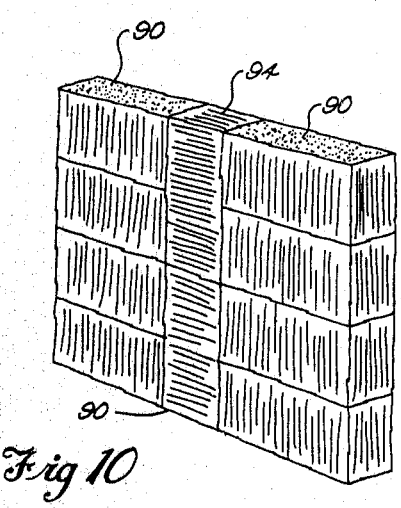
FIGURE 10 is still another modification of the tier of bales embodied in the present invention.

The tier layer shown in FIGURE 10 is similar to that shown in FIGURE 1 except that there are only four stacked bales 90 in each pile which bales are further disposed upright. The two middle stacked bales 92 and 94 are similar to the bales 44 and 42 in FIGURE 1 except they are turned in another direction so that the entire tier 10 has the longitudinal axis of the straw or hay stems extending in directions parallel to the side walls and the end walls of the completed tier.

Figure 11:
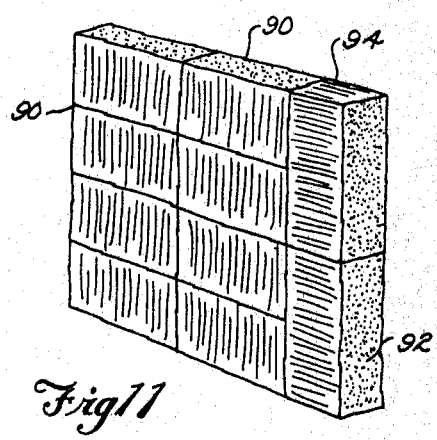
FIGURE 11 is a view of another modification of the arrangement of the tier of bales.

Referring to the embodiment of the invention shown in FIGURE 11, this is substantially the same as that shown in FIGURE 2 except that the two piles of bales 90 face in the same direction as that shown in FIGURE 10, and are four deep instead of five deep, and the two vertically stacked bales 92 and 94, similar to the bales 92 and 94 of FIGURE 10, are turned so that their sides extend parallel to the transverse axis of a vehicle upon which they are stacked.

Figure 12:
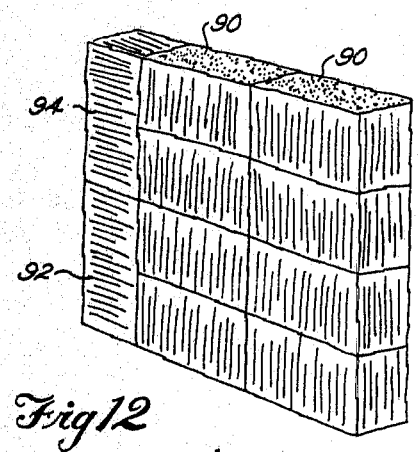
FIGURE 12 is a view of the tier of bales shown in FIGURE 11 but turned or rotated 180° in a clockwise direction.

The tier shown in FIGURE 12 is the same as that shown in FIGURE 11 except that this filler tier has been rotated or turned 180° in a clockwise direction from the tier shown in FIGURE 11. Thus this tier is oppositely disposed with respect to the tier shown in FIGURE 11.

Figure 13:
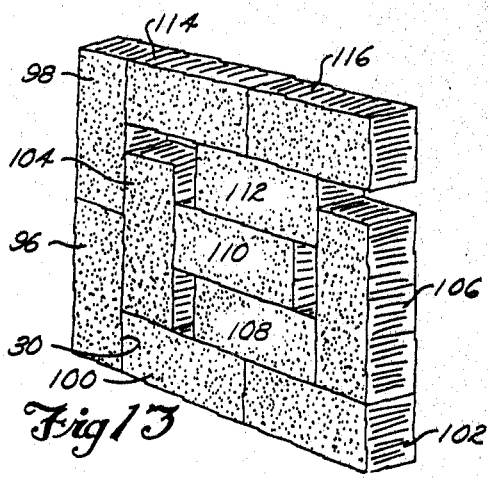
FIGURE 13 is another modification of the tier of bales embodied in the present invention.

Referring to the tier shown in FIGURE 13, this is a tie layer when in the stack and the layer comprises two bales 96 and 98 standing on end and disposed in vertical alignment with each other on the left side of the tier. Two bales 100 and 102 are disposed in a horizontal position and turned on their side with the left end of the bale 100 being disposed adjacent the inner side of the bale 96. Another bale 104 is disposed on its end and extends in a vertical direction adjacent the left end of the bale 100 and rests thereon with the bale 104 also abutting the inner sides of the bales 98 and 96. Another bale 106 is disposed on its end on the right top portion of the bale 102 and a horizontally disposed bale 108 is placed over the inner adjacent portions of the bales 100 and 102, with the bale 108 abutting the inner side of the bale 106. Another bale 110 is turned on its side and extends horizontally and is disposed on the top of the bale 108 with a space provided between the right end of the bale 110 and the bale 106. The left end of the bale 110 is disposed so as to abut the inner side of the bale 104. Another horizontally disposed bale 112 is disposed on top of the bale 110 and in staggered relationship therewith so as to provide a space adjacent the left end of the bale 112 and so that the right side or right end of the bale 112 abuts the side of the bale 106. Two other horizontal bales 114 and 116 are supported on top of the bale 112 with the bale 114 abutting the inner side of the bale 98 and the inner end of the bale 116 abutting the right end of the bale 114.

Figure 14:
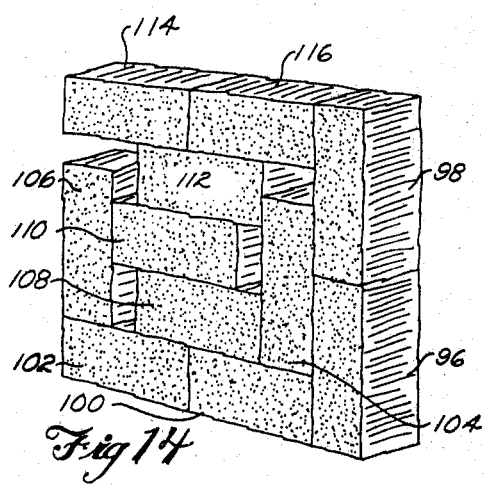
FIGURE 14 is a view of the tier of bales shown in FIGURE 13 except that it has been rotated 180° in a clockwise direction.

With reference to the tier shown in FIGURE 14, this is identical to the tier described in connection with FIGURE 13 except that it has been turned or rotated 180° in a clockwise direction.

Referring to FIGURE 15, the tier shown therein consists of two bales 118 and 120 disposed on their end on the left side of the tier with three vertically stacked horizontally extending bales 122, 124 and 126, having their left ends abutting the right side of the bale 120 with another bale 128 disposed on its end and abutting the right ends of the bales 122, 124 and 126. Two horizontally disposed bales 130 and 132 are disposed on top of the bale 126 and overlap the bales 118 and 120, and 128, respectively, so as to provide small gaps or spaces between the bale. Two other horizontal bales 134 and 136 are disposed in vertical alignment over bales 130 and 132 respectively.

Referring to FIGURE 16, the tier shown therein is substantially the same as that shown in FIGURE 15 except that it has been rotated or turned 180° in a clockwise direction.

Referring to FIGURE 17, there is shown therein a tier consisting of all the bales disposed on end so as to extend in a vertical direction, consisting of a lower pile 138, 140, 142, 144, 146 and 148 with the upper pile also consisting of six individual bales 150, 152, 154, 156, 158 and 160, all disposed in vertical alignment with their respective lower bale.

Referring to FIGURE 18, there is shown therein a tier consisting of two lower horizontal bales 164 and 166 between which is disposed a bale 160 standing on its end. The bale 164 has disposed thereon two bales 168 and 172, both standing on end with the bales 168 abutting the side of the vertical bale 160. The bale 166 also has two vertically disposed bales 170 and 174 thereon with the bale 170 disposed adjacent the right side of the bale 160. Another vertically disposed bale 162 is disposed on top of the vertical bale 160 while the two bales 168 and 172 have disposed thereon a horizontally extending bale 176 with its inner end abutting the vertical bale 162. Another horizontally disposed bale 178 is disposed across the upper ends of the bales 170 and 174 with the inner end of the bale 178 abutting the side of the bale 162. It will be noted that all of the bales are disposed so that the stems or stalks of the material of the bale, such as straw or hay, extends parallel to the front and rear sides of the tier.

Referring to FIGURE 19 and 19a, it will be noted that the tier shown therein is substantially the same as that shown in FIGURE 17 except that there are only five individual bales in each row or pile 180 and 182. It will also be noted that spaces are left between two adjacent and laterally disposed bales in the same row 180, or the row 182, so that the platform 36 of the vehicle can be provided with let-down beams 37 which act as the tines of a forklift for stacking as well as for reloading, or retrieving the discharged load of hay and the like, since they slip out from between the bales after the stack is in place. The beams 37 can also re-enter the spaces for reloading the stack on the vehicle platform. It will also be noted that the tier shown in FIGURE 19 acts as a pallet for the rest of the stack when the load is upended or discharged from the vehicle platform to the ground.

Referring to FIGURES 21 and 22, there is shown therein a load of stacked hay on a vehicle platform with the hay being stacked in individual tiers from the rear of the truck to the forward end thereof consisting of the following sequence, namely, tiers designated 1, 2, 3, 4, 5, 1, 3,

2, 5 and 4, which tiers correspond to the tiers shown in the corresponding figures already described.

With respect to FIGURE 22, a bale has been removed from the fourth tier from the upended load and it will be noted that tier 5 above the removed bale and tier 3 below the removed bale do not collapse because the non-symmetrical positioning of the bales causes the bales in the adjacent tiers from the tier 4 which has its bale removed, to overlap. Thus the individual cracks or gaps that occur between one bale and the adjacent bales in the adjacent tiers span over or bridge across the gaps so that a stable stack is provided.

Thus in accordance with the method of the present invention all of the bales remain firmly in place during the stacking process on the vehicle platform and in the upending and discharging of the completed load from the vehicle platform when the load is upended.

Inasmuch as various changes may be made in the particular form and arrangement of the invention and in the steps of the method as disclosed herein without departing from the principles of the invention, it will be understood that the invention is not to be limited except by the scope of the appended claims.

What is claimed is:

1. A method of stacking a load of hay and the like formed into individual bales on the flat surface of a vehicle platform so the complete load of bales can be upended and discharged from the flat platform as an integral load, without tumbling apart, and the load can still be maintained within an eight foot width dimension, comprising stacking a plurality of vertical tiers of individual bales in a vertical direction only, one vertical tier at a time, until the platform is filled, forming said tiers to extend transversely of the vehicle platform and disposing the bales in two adjacent tiers in non-symmetrical configuration to provide tie tiers to hold the load together upon upending the load, said non-symmetrical configuration being formed of bales disposed out of alignment with each other so as to cover the cracks between bales in said adjacent tiers, wherein at least one tier consists of two abutting horizontal bales, two superimposed vertical bales abutting one end of said horizontal bales, two spaced vertical bales on said horizontal bales, with two superimposed horizontal bales between said spaced vertical bales, and another two abutting horizontal bales disposed on said superimposed horizontal bales and spaced vertical bales, providing another tier formed by two vertically stacked abutting horizontally disposed bale piles, with two vertical superimposed bales abutting one side of one of said horizontally disposed bale piles, and a third tier formed of two vertically stacked piles of laterally abutting horizontal bales.

2. A method of stacking a load of hay and the like formed into individual bales on the flat surface of a vehicle platform so the complete load of bales can be upended and discharged from the flat platform as an integral load, without tumbling apart, and the load can still be maintained within an eight foot width dimension, comprising stacking a plurality of vertical tiers of individual bales in a vertical direction only, one vertical tier at a time until the platform is filled, forming said tiers to extend transversely of the vehicle platform and disposing the bales in two adjacent tiers in non-symmetrical configuration to provide tie tiers to hold the load together upon upending the load, said non-symmetrical configuration being formed of bales disposed out of alignment with each other so as to cover the cracks between bales in said adjacent tiers, wherein at least one tier consists of two abutting horizontal bales, two superimposed vertical bales abutting one end of said horizontal bales, two spaced vertical bales on said horizontal bales, with two superimposed horizontal bales between said spaced vertical bales, and another two abutting horizontal bales disposed on said superimposed horizontal bales and spaced vertical bales, providing another tier formed by two vertically stacked abutting horizontally disposed bale piles, with two vertical superimposed bales abutting one side of one of said horizontally disposed bale piles, and a third tier formed by two piles of horizontal bales laterally spaced and vertically stacked, and two vertical superimposed bales abutted on opposite sides by said two piles.

3. A method of stacking a load of hay and the like formed into individual bales on the flat surface of a vehicle platform so the complete load of bales can be upended and discharged from the flat platform as an integral load, without tumbling apart, and the load can still be maintained within an an eight foot width dimension, comprising stacking a plurality of vertical tiers of individual bales in a vertical direction only, one vertical tier at a time, until the platform is filled, forming said tiers to extend transversely of the vehicle platform and disposing the bales in two adjacent tiers in non-symmetrical configuration to provide tie tiers to hold the load together upon upending the load, said non-symmetrical configuration being formed of bales disposed out of alignment with each other so as to cover the cracks between bales in said adjacent tiers, wherein at least one tier consists of two abutting horizontal bales, two superimposed vertical bales abutting one end of said horizontal bales, two spaced vertical bales on said horizontal bales, with two superimposed horizontal bales between said spaced vertical bales, and another two abutting horizontal bales disposed on said superimposed horizontal bales and spaced vertical bales, providing another tier formed by two vertically stacked abutting horizontally disposed bale piles, with two vertical superimposed bales abutting one side of one of said horizontally disposed bale piles, and a third tier is formed by two laterally abutting vertical piles of horizontal bales, another vertical pile of horizontal bales on said first mentioned vertical piles, and vertical bales abutting opposite ends of said another vertical pile.

4. A method of stacking a load of hay and the like formed into individual bales on the flat surface of a vehicle platform so the complete load of bales can be upended and discharged from the flat platform as an integral load, without tumbling apart, and the load can still be maintained within an eight foot width dimension, comprising stacking a plurality of vertical tiers of individual bales in a vertical direction only, one vertical tier at a time, until the platform is filled, forming said tiers to extend transversely of the vehicle platform and disposing the bales in two adjacent tiers in non-symmetrical configuration to provide tie tiers to hold the load together upon upending the load, said non-symmetrical configuration being formed of bales disposed out of alignment with each other so as to cover the cracks between bales in said adjacent tiers, wherein at least one tier consists of two abutting horizontal bales, two superimposed vertical bales abutting one end of said horizontal bales, two spaced vertical bales on said horizontal bales, with two superimposed horizontal bales between said spaced vertical bales, and another two abutting horizontal bales disposed on said superimposed horizontal bales and spaced vertical bales, providing another tier formed by two vertically stacked abutting horizontally disposed bale piles, with two vertical superimposed bales abutting one side of one of said horizontally disposed bale piles, and a third tier is formed of lateral vertical superimposed bales.

5. A method of stacking a load of hay and the like formed into individual bales on the flat surface of a vehicle platform so the complete load of bales can be upended and discharged from the flat platform as an integral load, without tumbling apart, and the load can still be maintained within an eight foot width dimension, comprising stacking a plurality of vertical tiers of individual bales in a vertical direction only, one vertical tier at a time, until the platform is filled, forming said tiers to extend transversely of the vehicle platform and disposing the bales in two adjacent tiers in non-symmetrical configuration to provide tie tiers to hold the load together upon upending the load, said non-symmetrical configuration being formed of bales disposed out of alignment with each other so as to cover the cracks between bales in said adjacent tiers, wherein at least one tier consists of two abutting horizontal bales, two superimposed vertical bales abutting one end of said horizontal bales, two spaced vertical bales on said horizontal bales, with two superimposed horizontal bales between said spaced vertical bales, and another two abutting horizontal bales disposed on said superimposed horizontal bales and spaced vertical bales, providing another tier formed by two vertically stacked abutting horizontally disposed bale piles, with two vertical superimposed bales abutting one side of one of said horizontally disposed bale piles, and a third tier is formed of a middle row of vertical superimposed bales with horizontal bales vertically spaced abutting opposite sides of said vertical bales, and other vertical bales between said spaced horizontal bales and on opposite sides of said vertical bales.

6. The method of claim 1 wherein said one tier and another tier are turned one hundred and eighty degrees from the position of said one and another tiers.

References Cited

UNITED STATES PATENTS

| | | |
|---|---|---|
| 2,630,214 | 3/1953 | Reed. |
| 2,997,187 | 8/1961 | Burt. |
| 2,828,031 | 3/1958 | Babcock et al. |
| 3,013,682 | 12/1961 | Unruh. |
| 3,257,015 | 6/1966 | Annable et al. _____ 214—152 |
| 3,289,859 | 12/1966 | Tarbox. |

GERALD M. FORLENZA, Primary Examiner

ROBERT J. SPAR, Assistant Examiner

U.S. Cl. X.R.

214—6, 10.5